March 13, 1951     E. E. MARTIN     2,545,000
VALVE AND FITTING
Filed Nov. 20, 1944
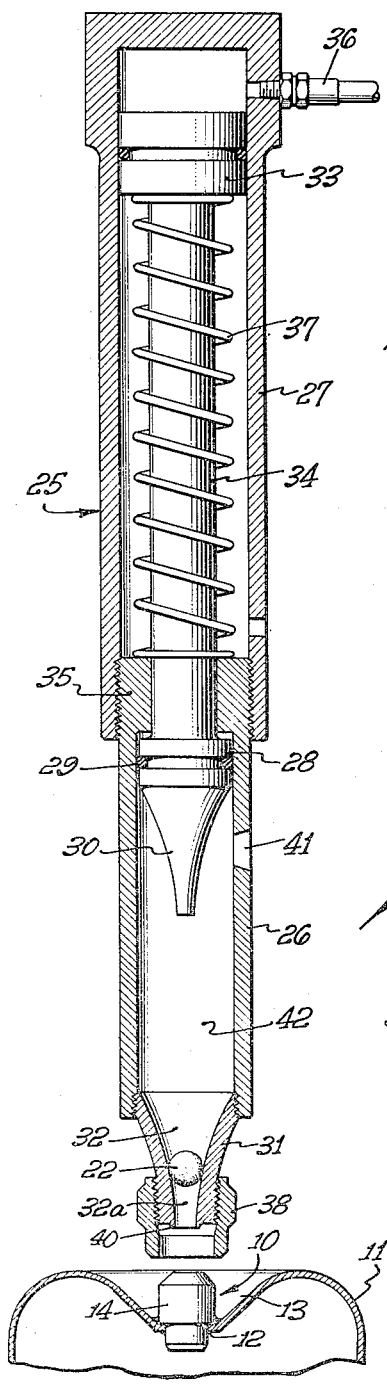
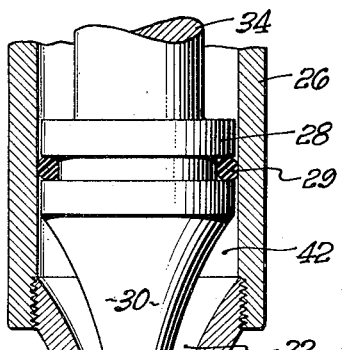
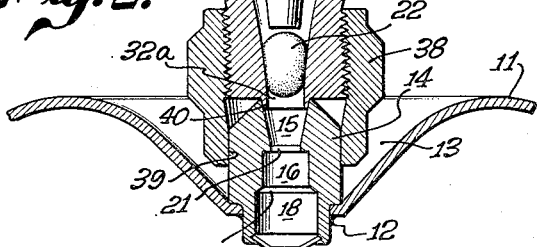
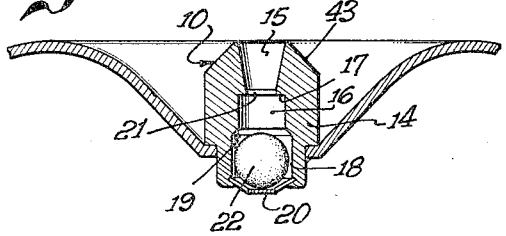
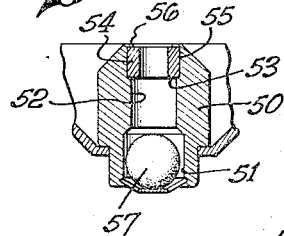
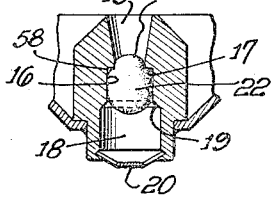
EARNEST E. MARTIN,
INVENTOR.
BY
ATTORNEY.

Patented Mar. 13, 1951

2,545,000

UNITED STATES PATENT OFFICE 2,545,000

VALVE AND FITTING

Earnest E. Martin, Redondo Beach, Calif., assignor to Ralph Walsh, Los Angeles, Calif.

Application November 20, 1944, Serial No. 564,352

4 Claims. (Cl. 251—121)

This invention has to do generally with improvements in valve or fluid line closure devices, particularly of the type in which the valve or closure element is self-acting in response to fluid pressure, to effect a tight seal. In comparison with prior valve and sealing devices, the present invention is perhaps most similar to check-type valves, but embodies certain fundamental distinctions, all as will hereinafter appear.

It is to be understood that the invention contemplates the use and adaptation of the invention for various particular purposes and for appropriate valve or sealing devices in general. For purposes of description and illustration, but without limitation to its broad aspects, I have chosen to explain the invention in a typical and, as to certain features, preferential embodiment in a self-sealing fitting for pressure containers.

The invention may be characterized as comprising a tubular body containing an elastic deformable valve or closure element, preferably free-moving so as to be displaceable by oppositely applied fluid pressures into and out of sealing relation with an opening or seat in the body. In its preferred though typical form, the valve element is spherical and is made of rubber to permit deformation in its sealing engagement with the body, and substantial restoration of its shape when in open position.

The seal primarily is effected by reception of the ball valve within a bore, the diameter of which is somewhat less than the valve diameter so that the valve undergoes radial compression and deformation upon fully entering the bore. After being received within the bore, the valve engages an apertured shoulder or seat, the primary purpose of which is to limit further displacement of the valve in a closing direction, although a further effect of the shoulder is to maintain a secondary fluid seal by virtue of its engagement by the valve. Arrested by the shoulder, the valve tends to become compressed axially of the bore and to expand radially thereof in response to increasing and closing fluid pressures. An absolute seal exists at the bore-engaging surface of the valve, and as the pressure against the valve increases the seal becomes tighter because of the expanding tendency of the valve. Another characteristic of the valve or sealing element is that it is contained at substantially its greatest diameter within the bore against the wall of which the seal is effected.

A further important object of the invention is to adapt the valve and the valve body or fitting to insertion of the valve into the fitting through an open passage intended to be sealed at its inner end by the valve. The particular means or tool for so inserting the valve in the body or fitting comprises the claimed subject matter of my copending application Serial No. 564,353, filed November 20, 1944, which matured into Patent No. 2,438,642, issued March 30, 1948, and entitled Apparatus for Inserting Valve Elements.

The various objects and features will be more fully understood from the following detailed description of an illustrative embodiment of the invention. Reference is had throughout the description to the accompanying drawings, in which:

Fig. 1 is a sectional view showing the ball inserting tool, with the container fitting appearing in elevation;

Fig. 2 is an enlarged fragmentary sectional view showing the inserting tool applied to the fitting with the plunger extension approaching the ball contacting position;

Fig. 3 shows the ball in open or non-sealing position within the fitting;

Fig. 4 illustrates the ball position when forced by the container pressure into sealing condition within the fitting; and Fig. 5 is a view illustrating a variational form of the invention.

Typically the closure or valve device is shown to consist of a fitting, generally indicated at 10, applied to a container 11 for pressure fluids. For example, the fitting has proven particularly successful as a filling and sealing device for aerosol type insecticide containers which are filled through the fitting 10 with a high vapor pressure composition such as a solution of pyrethrum and sesame oil in dichlorodifluoromethane, the latter having a normal vapor pressure of around 70–80 pounds per square inch. Although incidental to the invention, the fitting 10 is shown to be welded at 12 within the cavitated bottom portion 13 of the container.

The fitting comprises a tubular body 14 containing a passage 15 opening into and tapering toward a cylindrical bore 16. In the juncture of the passage and the bore is an annular shoulder 17 formed at substantially 90° with the wall of the bore 16. Counterbore 18 joins the bore 16 at the tapered shoulder 19, and contains at its lower end a spider or apertured support 20 for the ball check. As typical dimensions within a fitting adapted to the particular purpose illustrated, counterbore 18 may have a diameter of 0.250 inch, bore 16 a diameter 0.187 inch and the throat 21 a diameter at of about 0.125 inch.

The fitting contains a ball check 22 made of a suitable elastic and deformable material, preferably a rubber resistant to any solvent properties of the container solution, and where the ball is to be inserted through the passage 15 as later explained, having the proper hardness to thereafter resist displacement out of the fitting and yet maintain a perfect fluid-tight seal. In the type and size fitting shown, the rubber ball will have a hardness within the range of 40—65 as measured by the Shore Durometer. Of essential importance is the relationship between the ball size and the diameter of the bore 16. The ball diameter preferably is larger than the bore diameter, typically in the size fitting described, by an amount not in excess of about 0.010 inch. Successful results have been had where the ball diameter exceeds the bore diameter by 0.005 inch.

It is to be particularly observed that the sealing action and effect of the ball are fundamentally different from those of an ordinary ball check which maintains its seal soley at and by virtue of engagement with an annular seat. Referring to Fig. 4, when the ball 22 is displaced by the container pressure upwardly from the position of Fig. 3 into the bore 16, the ball, having a larger diameter than the bore, is radially compressed and deformed when a diameter of the ball enters the bore. Also the maximum diameter or cross-sectional dimension of the ball is contained within the bore. The pressure displaces the ball until it engages against the shoulder 17, and depending upon the magnitude of the pressure, a greater or lesser quantity of the rubber may become displaced at 23 into the throat 21 and passage 15, but however without forcing the ball out of the fitting even under extremely high pressures. The primary seal is effected at the surfaces of engagement between the ball and the bore 16. After engagement of the ball with shoulder 17, the pressure applied to the ball tends to expand it tightly against the bore wall, and the tightness of the engagement and seal increase as the pressure increases. A secondary seal is of course maintained by the ball engagement against and within the shoulder 17, but as indicated, the primary function of the shoulder is to support the ball for radial expansion under the applied pressure against the bore wall 16.

It may be mentioned that if desirable, the fitting may be permanently sealed after the container 11 is charged, by filling passage 15 above the ball with solder or other permanent sealing material.

For various reasons, as under the following circumstances, it may be desirable to provide for the insertion of the ball into the fitting through the passage 15. Attachment of the fitting 10 to the container may be effected by completing the weld at 12 by heating the container and fitting in an oven at a temperature of around 500° F. Obviously, the rubber ball would be injured at this temperature; hence the desirability for inserting the ball into the fitting after the latter is welded to the container.

Ball inserting means is used to apply pressure to the ball in a manner causing it to be radially deformed and projected through passage 15 into the fitting. Particularly the inserting means contemplates the application of fluid pressure and force against the ball, in a manner and amount such as to cause the ball to be projected into the fitting with a stream of the fluid.

As illustrative, the inserting tool, generally indicated at 25, is shown to comprise suitably interconnected barrel and cylinder sections 26 and 27 which may have differential diameters, substantially as illustrated. The barrel 26 contains a plunger 28 carrying a sealing ring 29 and a downwardly curved and convergent extension 30. The lower end of the barrel carries a tubular nozzle 31, the bore 32 of which is shaped substantially in conformance with the plunger extension 30. Plunger 28 is connected to a piston 33 in the cylinder 27 by a rod 34 which extends through the bearing 35. Compressed air introduced to cylinder 27 above the piston 33 from line 36 under control of a suitable valve (not shown) displaces the piston and plunger downward against the resistance of coil spring 37, and the latter returns the parts to the position illustrated when the air pressure is relieved.

The nozzle 31 carries a guide nut 38 engageable with the fitting 10 upon relative movement together of the inserting tool and fitting, see Fig. 2, as by elevation of the container 11. The guide nut 38 contains a bore 39 which receives the body of the fitting, and the lower end of the nozzle 31 has a projecting lip 40 which enters the upper end of the passage 15. At its lower end 32a, the nozzle bore is substantially straight, or has just slight downward taper.

Assuming the inserting tool to be applied to the fitting and the plunger 28 to be in the position of Fig. 1, the ball 22 may be inserted through an opening 41 in the side of the barrel and dropped into the nozzle passage as illustrated. As the plunger 28 moves downward below the opening 41, it compresses the air in chamber 42 to a high degree sufficient to force the ball 22 downwardly within the converging throat of the nozzle bore, as exemplified in Fig. 2. Thus the ball becomes elongated and radially reduced, while high air pressure continues to be exerted against the ball, tending to force it through into the fitting. In this condition, the ball is engaged by the lower end of the plunger extension 30 as the latter approaches or nears the lower limit of its travel, and as a result the ball is projected out of the nozzle bore and through passage 15 and bore 16 into the fitting counter-bore 18. It may be mentioned that in practice, the downward travel of the plunger and the projection of the ball in the fitting can be made to occur almost instantaneously.

It is not essential to the operation of the injecting tool that the ball be inserted in the barrel 42, as described. Instead, the ball first may be inserted by hand within the passage 15 and the tool 25 then applied to the fitting. Downward movement of the plunger serves, as before, to deform and crowd the ball downwardly within the passage 15, and at the end of its travel, the plunger extension 30 engages the ball and causes it to be projected into the counterbore 18.

With the ball now contained in the fitting and in the position of Fig. 3, the tapered surface 43 of the fitting may be applied to the head or nozzle of a filling machine, and fluid introduced to the container through the clearance at 44 between the ball and larger diameter counterbore 18. Upon the introduction of a high pressure fluid to the container, the ball 22 closes into the bore 16 to form a fluid-tight seal, all as previously explained.

Fig. 5 illustrates a variational form of the invention differing from the described embodiment in the formation of the body shoulder and the method of inserting the valve. Here the body 50 contains bores 51 and 52 having the same relationship as bores 18 and 16. The ball arresting shoulder 53 is formed by a tubular insert 54 ultimately retained in bore 55 by crimping or turning the body metal at 56 over the end of the insert.

Instead of injecting the ball into the fitting as in the first described form, the ball 57 is first put into the body in advance of the insert 54. After the latter is inserted and the metal crimped over at 56, the fitting is ready for injection of the fluid charge into the container.

It is particularly desirable that shoulders 17 and 53 against which the valve element engages, be of such formation, e. g. at 90° with relation to bores 16 and 52, as to provide for an annular air space at 58, see Fig. 4, when the ball engages and seals against the inner edge of the shoulder. The maintenance of the air space at 58 permits deformation of the valve into the space in response to the container pressure acting against the valve, all in a manner reducing the tendency of the valve to be forced out through the passage 15.

I claim:

1. A valve device comprising a tubular body containing a rigid wall bore of substantially uniform diameter, a substantially annular shoulder at one end of the bore, an elastic deformable valve receivable within said bore and engageable against said shoulder, said valve when unstressed having circular cross-section at a diameter greater than the diameter of said bore so that the valve is radially compressed and deformed when received within the bore to effect a primary seal by engagement with the bore wall, the valve also when seated against the shoulder being deformed into the space at the juncture of said shoulder and the bore, said deformation becoming greater and said seal therefore becoming more effective as fluid pressure forcing the valve against the shoulder is increased, thereby causing increasing resistance to the tendency of high fluid pressure to force the valve through said shoulder, and a counter-bore of larger diameter than the valve at the end of the first mentioned bore opposite said shoulder, the valve being displaceable from one to the other of said bores by oppositely applied fluid pressures.

2. A valve device comprising a tubular body containing a rigid wall bore of substantially uniform diameter, a substantially annular shoulder at one end of the bore, an elastic deformable spherical valve receivable within said bore and engageable against said shoulder, the diameter of said valve when unstressed being greater than the diameter of said bore so that the valve is radially compressed and deformed when received within the bore, the valve also when seated against the shoulder being deformed into the space at the juncture of said shoulder and the bore, said deformation becoming greater and said seal therefore becoming more effective as fluid pressure forcing the valve against the shoulder is increased, thereby causing increasing resistance to the tendency of high pressure to force the valve through said shoulder, a counter-bore at the end of the first mentioned bore opposite said shoulder, a tapered annular shoulder between said bores, and means for retaining the valve in said counter-bore while permitting fluid flow past the valve.

3. A valve device comprising a tubular body containing a cylindrical bore, a shoulder at one end of said bore and about a passage having a tapered wall converging toward said bore, and an elastic deformable valve insertible through said passage and bore into an enlarged counter-bore beyond the bore and being reversely displaceable by fluid pressure from said counterbore into the bore and against said shoulder, the valve having a diameter greater than the diameter of said bore so that the valve is radially compressed and deformed when received within the bore and while seated against said shoulder is deformed into a space at the juncture of the shoulder with the bore wall while remaining in engagement with said wall, said deformation becoming greater and said seal therefore becoming more effective as fluid pressure forcing the valve against said shoulder is increased, thereby causing increasing resistance to the tendency of high fluid pressure to force the valve through the shoulder.

4. A closure device comprising a tubular body containing a rigid wall bore of substantially uniform diameter, a substantially 90 degree annular shoulder at one end of the bore, and an elastic deformable spherical closure formed of solid material throughout and receivable within said bore and engageable against said shoulder, the closure when unstressed having a diameter greater than the diameter of said bore so that the closure is radially compressed and deformed when received within the bore to effect a primary seal by engagement with the bore wall, the closure also when seated against the shoulder being deformable only by fluid pressure applied to the closure into the space at the juncture of said shoulder and the bore, said deformation becoming greater and said seal therefore becoming more effective as fluid pressure forcing the closure against said shoulder is increased, thereby causing increasing resistance to the tendency of high fluid pressure to force the closure through said shoulder.

EARNEST E. MARTIN.

REFERENCES CITED

The following references are of record in the file of this patent:

UNITED STATES PATENTS

| Number | Name | Date |
| --- | --- | --- |
| 45,373 | Beard et al. | Dec. 6, 1864 |
| 143,294 | Mendham | Sept. 30, 1873 |
| 343,327 | Lowrie | June 8, 1886 |
| 1,508,635 | Woodham | Sept. 16, 1924 |
| 2,200,785 | Watson | May 14, 1940 |
| 2,371,293 | Hoof | Mar. 13, 1945 |
| 2,375,498 | Seymour | May 8, 1945 |

FOREIGN PATENTS

| Number | Country | Date |
| --- | --- | --- |
| 3,595 | Great Britain | Oct. 19, 1874 |
| 60,752 | Norway | Apr. 17, 1939 |